Figure 1:
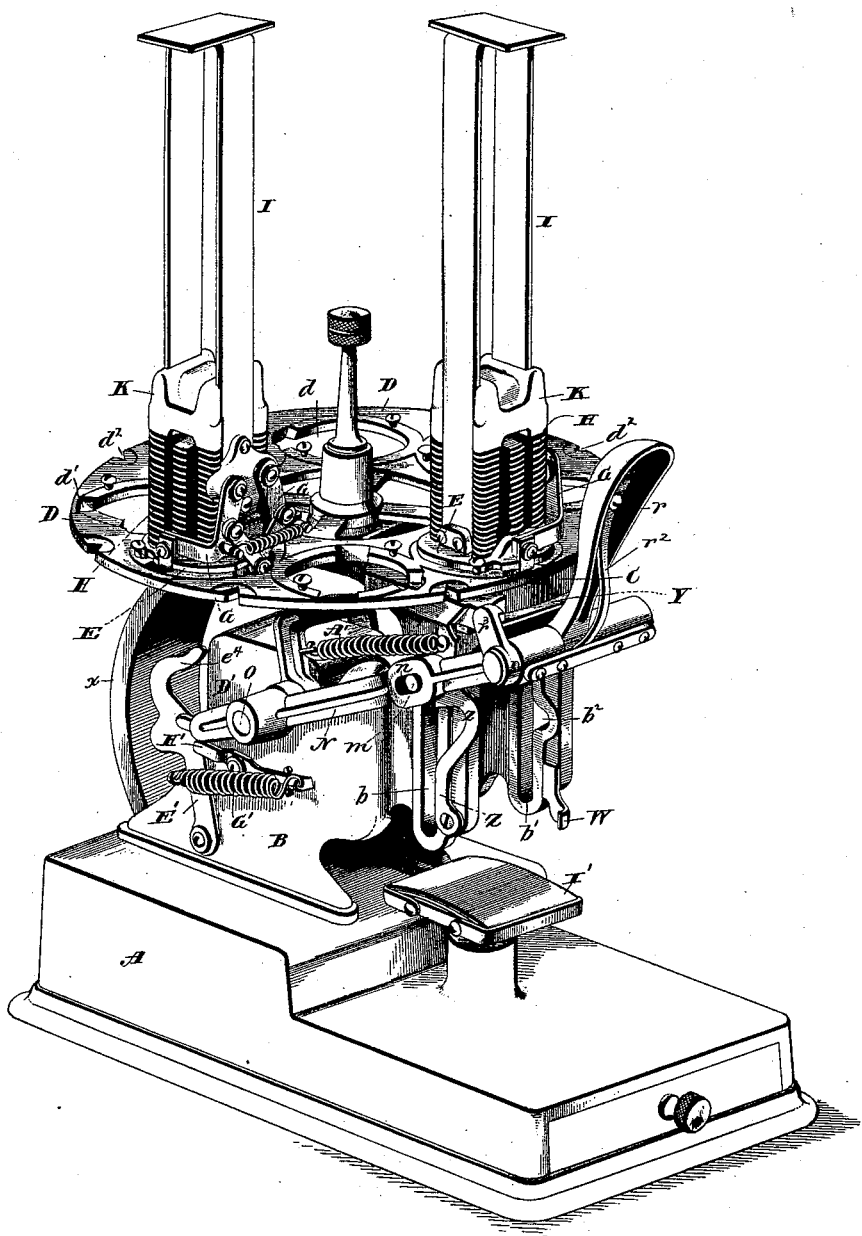

(No Model.)  14 Sheets—Sheet 1.

C. W. TOBEY.
APPARATUS FOR ATTACHING ADHESIVE STAMPS.

No. 447,212.  Patented Feb. 24, 1891.

Witnesses
Chas. J. Williamson.
Henry C. Hazard.

Inventor
Chas. W. Tobey, by.
Prindle and Russell, his Attys (No Model.) 14 Sheets—Sheet 2.
C. W. TOBEY.
APPARATUS FOR ATTACHING ADHESIVE STAMPS.
No. 447,212. Patented Feb. 24, 1891.

Witnesses
Chas. J. Williamson.
Henry C. Hazard.

Inventor
Chas. W. Tobey, by
Prindle and Russell his Attys (No Model.) 14 Sheets—Sheet 3.
C. W. TOBEY.
APPARATUS FOR ATTACHING ADHESIVE STAMPS.

No. 447,212. Patented Feb. 24, 1891.

(No Model.) 14 Sheets—Sheet 4.
C. W. TOBEY.
APPARATUS FOR ATTACHING ADHESIVE STAMPS.
No. 447,212. Patented Feb. 24, 1891.

Witnesses
Chas. J. Williamson
Henry C. Hazard

Inventor
Chas. W. Tobey, by
Prindle and Russell, his Attys (No Model.) 14 Sheets—Sheet 5.
C. W. TOBEY.
APPARATUS FOR ATTACHING ADHESIVE STAMPS.

No. 447,212. Patented Feb. 24, 1891.

(No Model.) 14 Sheets—Sheet 6.
C. W. TOBEY.
APPARATUS FOR ATTACHING ADHESIVE STAMPS.

No. 447,212. Patented Feb. 24, 1891.

Witnesses
Chas. J. Williamson.
Henry C. Hazard.

Inventor
Chas. W. Tobey, by
Crindle and Russell, his Attys.

(No Model.) 14 Sheets—Sheet 7.
C. W. TOBEY.
APPARATUS FOR ATTACHING ADHESIVE STAMPS.

No. 447,212. Patented Feb. 24, 1891.

Witnesses
Chas. J. Williamson
Henry C. Hazard

Inventor
Chas. W. Tobey, by
Prindle and Russell, his Attys

THE NORRIS PETERS CO., PHOTO-LITHO., WASHINGTON, D. C.

(No Model.) 14 Sheets—Sheet 8.
C. W. TOBEY.
APPARATUS FOR ATTACHING ADHESIVE STAMPS.

No. 447,212. Patented Feb. 24, 1891.

Witnesses
Chas. J. Williamson.
Henry C. Hazard.

Inventor
Chas. W. Tobey, by
Crindle W Russell, his Attys (No Model.) 14 Sheets—Sheet 9.
C. W. TOBEY.
APPARATUS FOR ATTACHING ADHESIVE STAMPS.
No. 447,212. Patented Feb. 24, 1891.

Witnesses
Chas. J. Williamson
Henry C. Hazard

Inventor
Chas. W. Tobey, by
Dindle and Russell, his Att'ys (No Model.) 14 Sheets—Sheet 10.
C. W. TOBEY.
APPARATUS FOR ATTACHING ADHESIVE STAMPS.

No. 447,212. Patented Feb. 24, 1891.

(No Model.) 14 Sheets—Sheet 11.

C. W. TOBEY.
APPARATUS FOR ATTACHING ADHESIVE STAMPS.

No. 447,212. Patented Feb. 24, 1891.

Witnesses
Chas. J. Williamson
Henry C. Hazard

Inventor
Chas. W. Tobey, by
Dindle and Russell, his Attys (No Model.) 14 Sheets—Sheet 12.
C. W. TOBEY.
APPARATUS FOR ATTACHING ADHESIVE STAMPS.
No. 447,212. Patented Feb. 24, 1891.
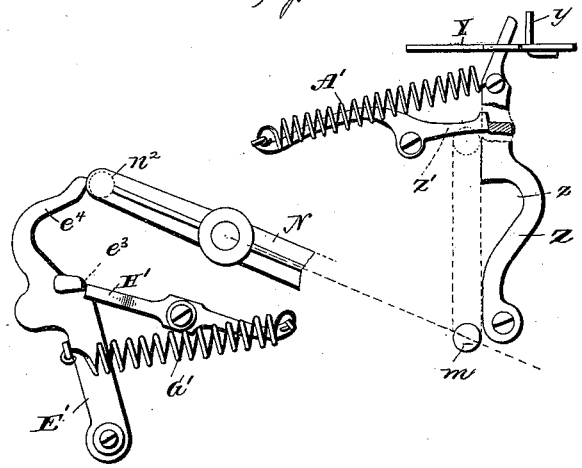
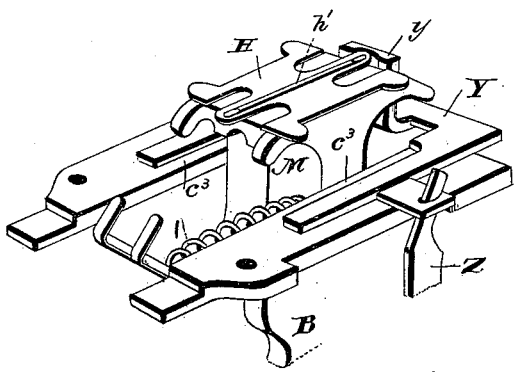
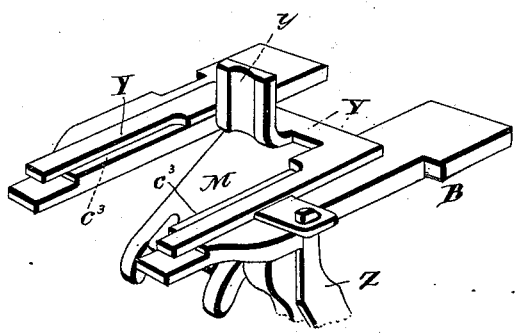

(No Model.) 14 Sheets—Sheet 13.

C. W. TOBEY.
APPARATUS FOR ATTACHING ADHESIVE STAMPS.

No. 447,212. Patented Feb. 24, 1891.

Witnesses
Chas. J. Williamson.
Henry C. Hazard.

Inventor
Chas. W. Tobey, by
Prindle and Russell, his Attys (No Model.) 14 Sheets—Sheet 14.
C. W. TOBEY.
APPARATUS FOR ATTACHING ADHESIVE STAMPS.

No. 447,212. Patented Feb. 24, 1891.

Witnesses
Chas. J. Williamson.
Henry C. Hazard.

Inventor
Chas. W. Tobey, by
Prindle and Russell his Attys

UNITED STATES PATENT OFFICE.

CHARLES W. TOBEY, OF NEW BEDFORD, MASSACHUSETTS, ASSIGNOR TO BURT & TOBEY, OF SAME PLACE.

APPARATUS FOR ATTACHING ADHESIVE STAMPS.

SPECIFICATION forming part of Letters Patent No. 447,212, dated February 24, 1891.

Application filed April 11, 1890. Serial No. 347,471. (No model.)

*To all whom it may concern:*

Be it known that I, CHARLES W. TOBEY, of New Bedford, in the county of Bristol, and in the State of Massachusetts, have invented certain new and useful Improvements in Apparatus for Attaching Adhesive Stamps; and I do hereby declare that the following is a full, clear, and exact description thereof, reference being had to the accompanying drawings, in which—

Figure 2:
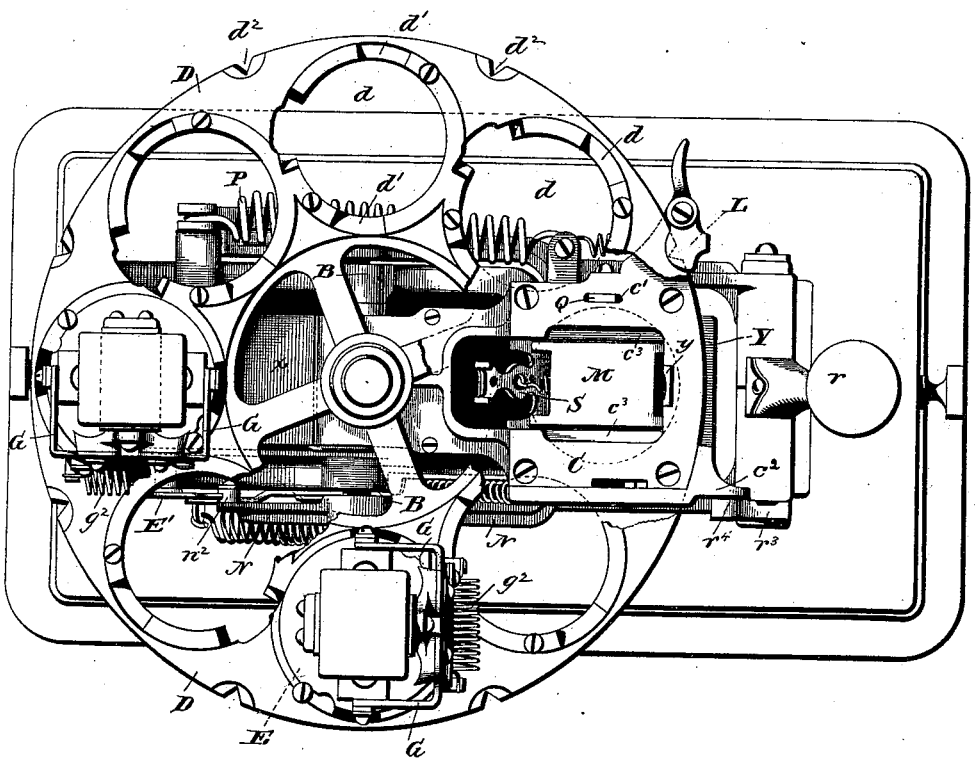
Figure 3:
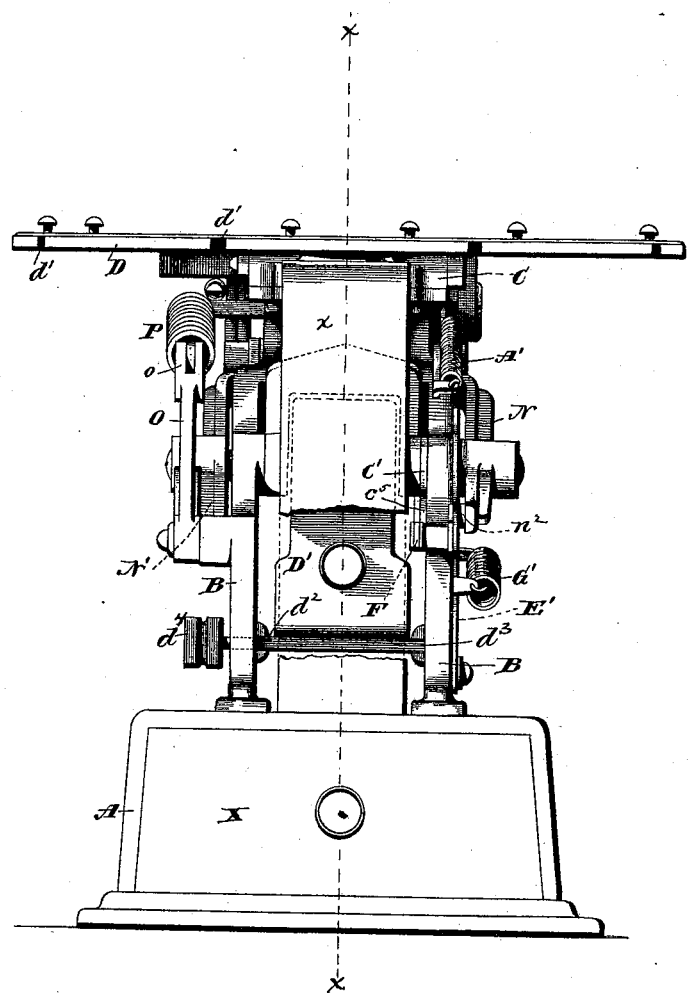
Figure 4:
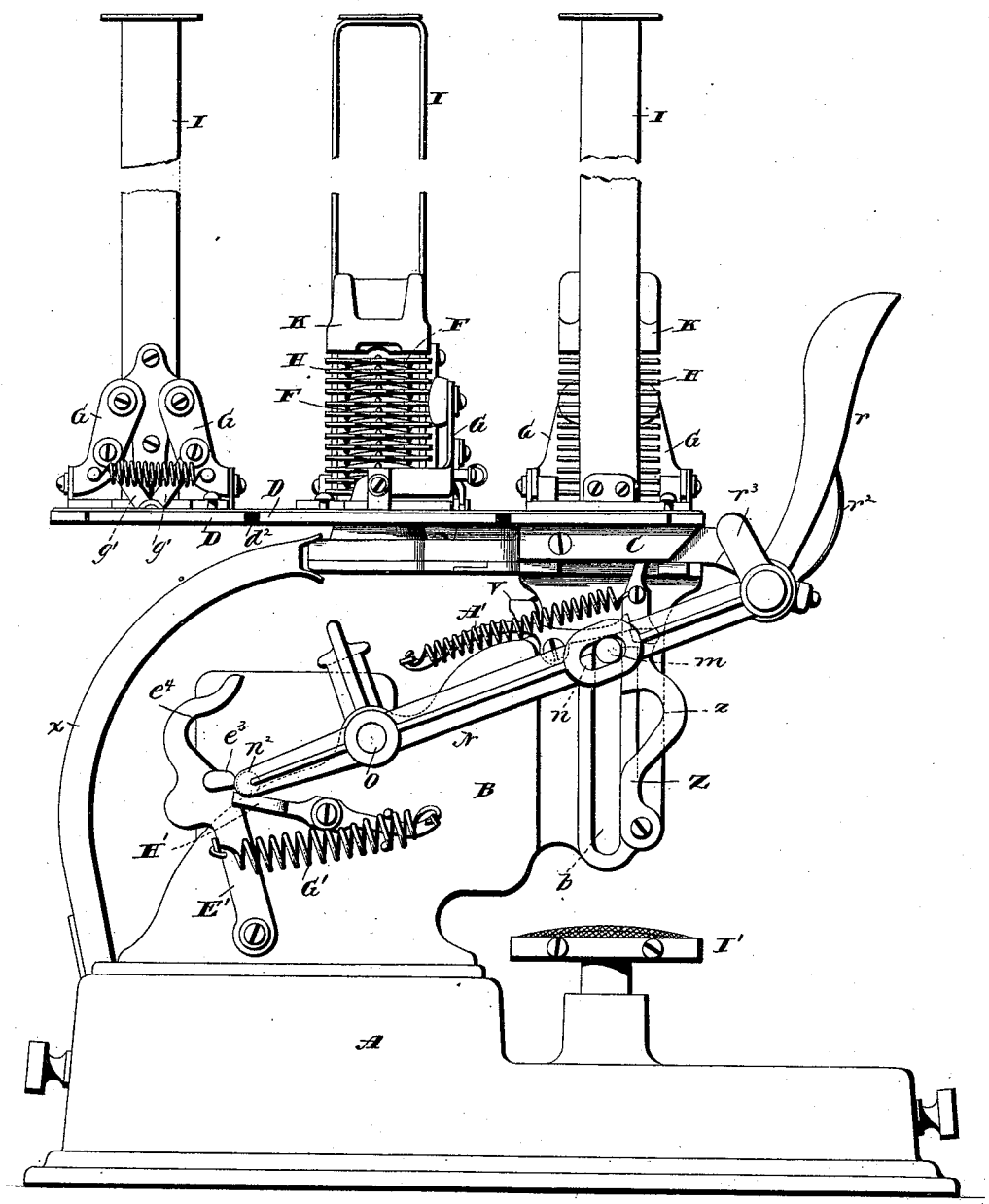
Figure 5:
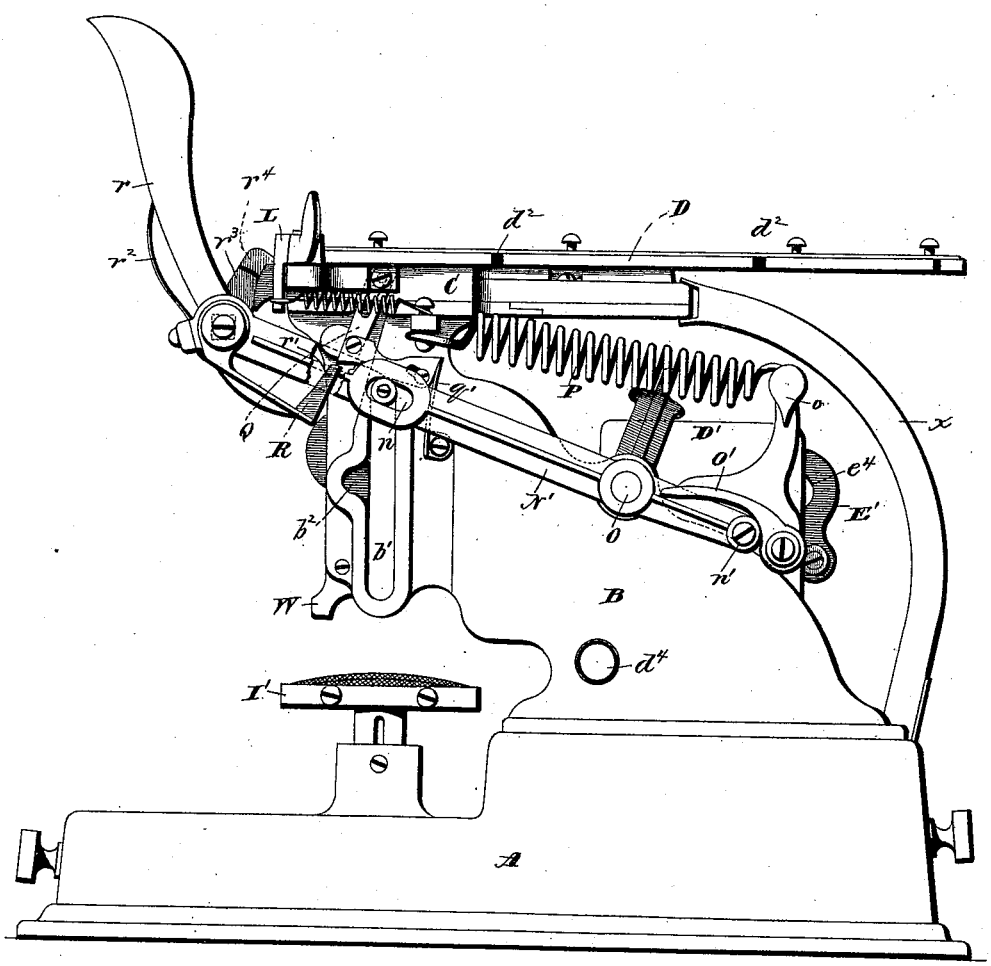
Figure 6:
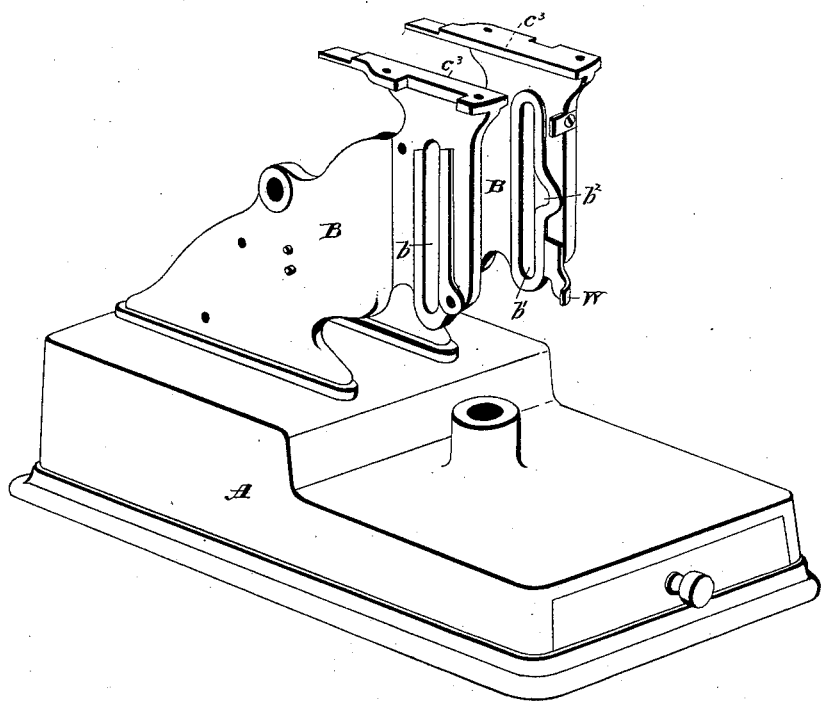
Figure 7:
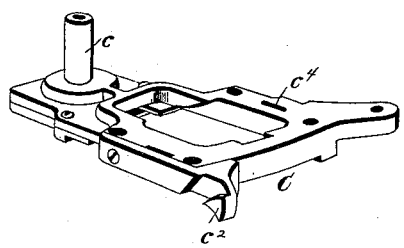
Figure 8:
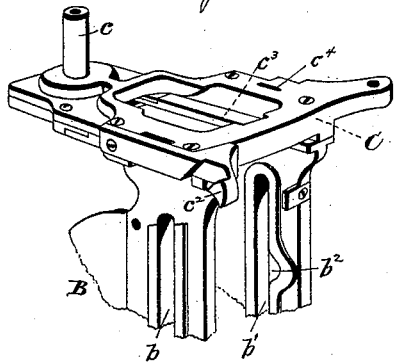
Figure 9:
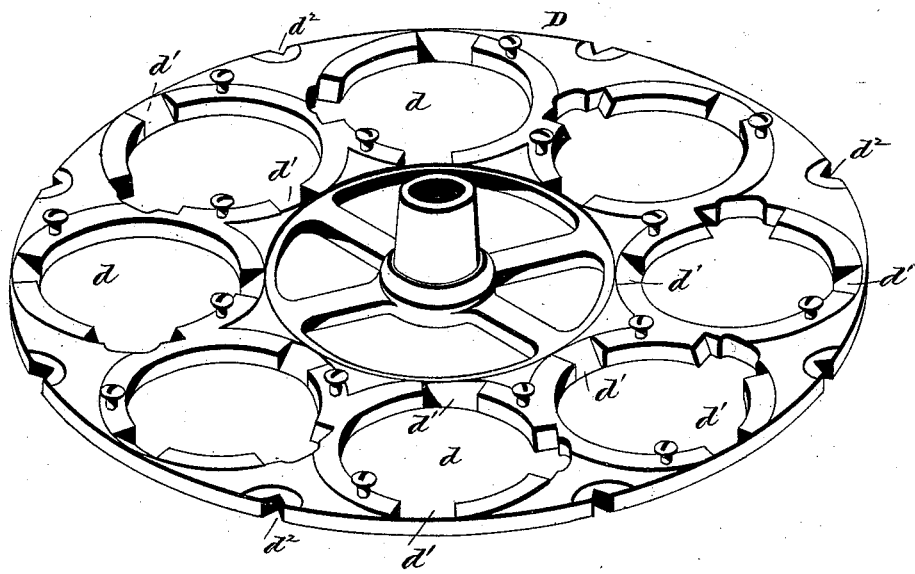
Figure 10:
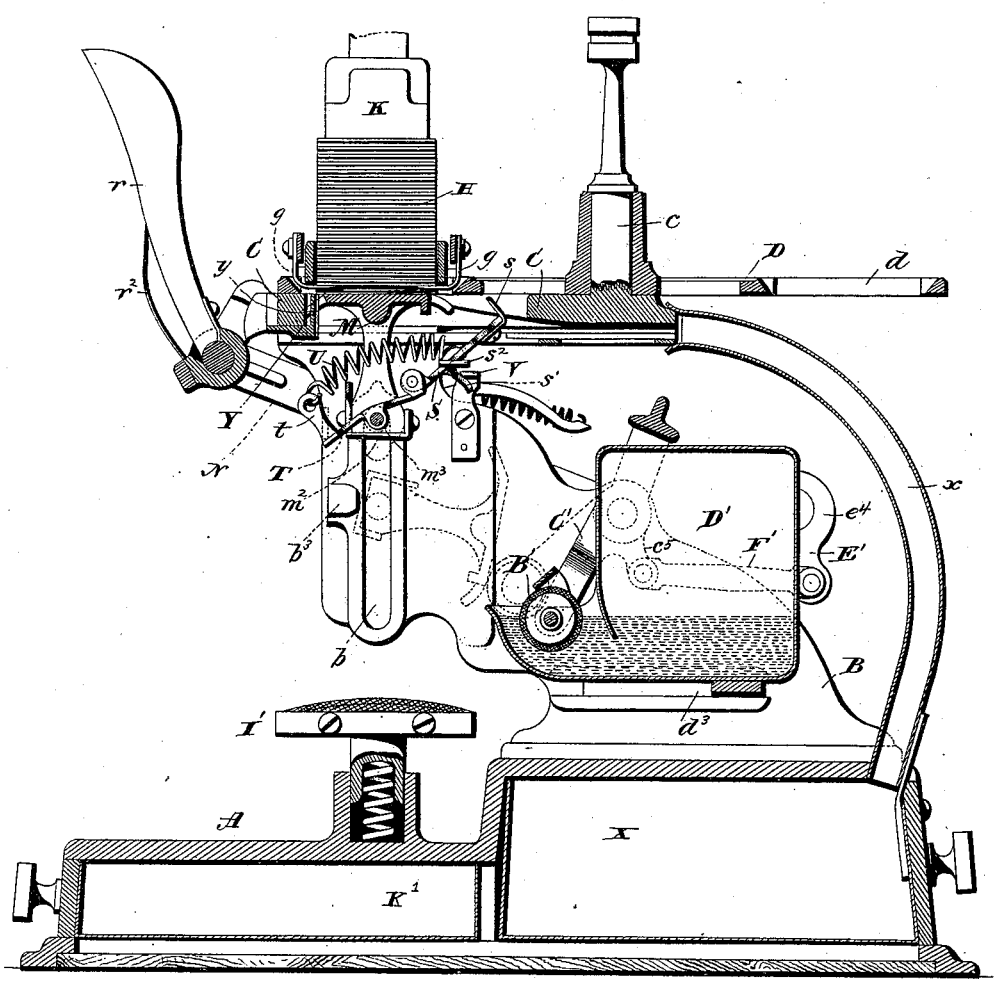
Figure 11:
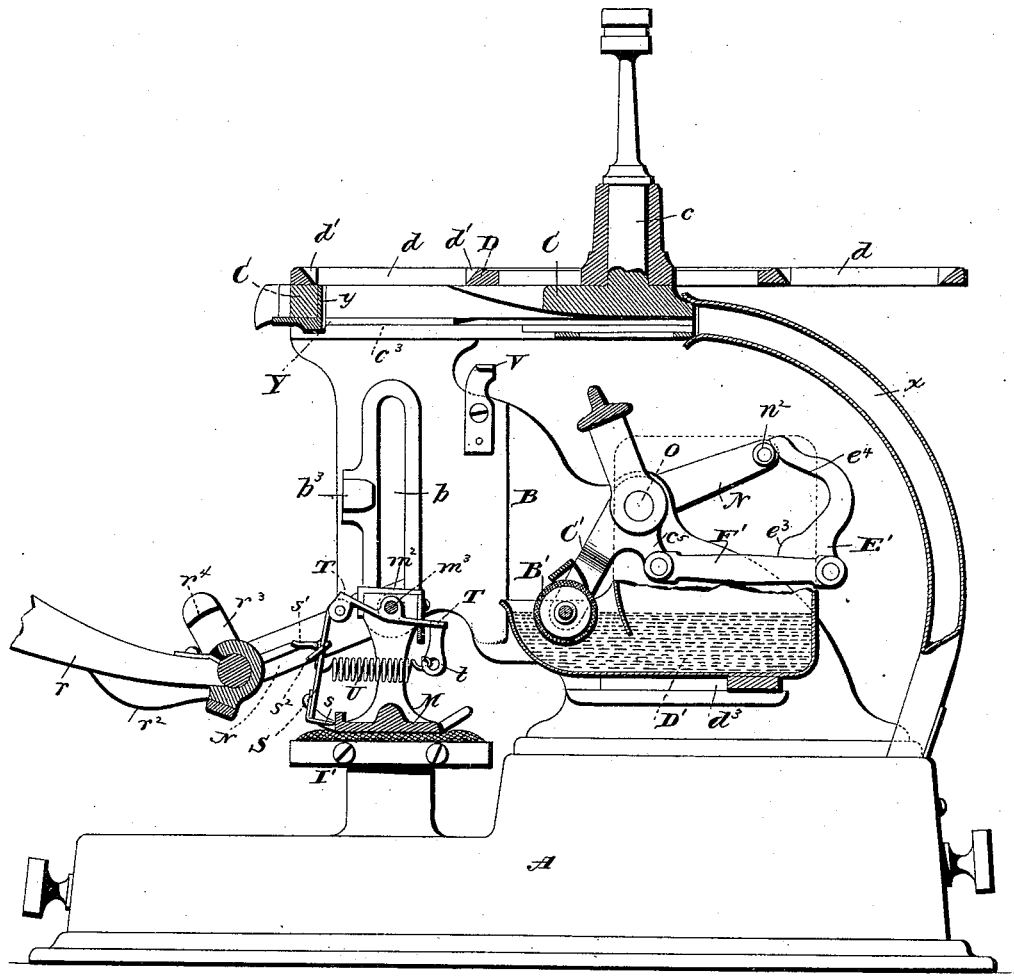
Figure 12:
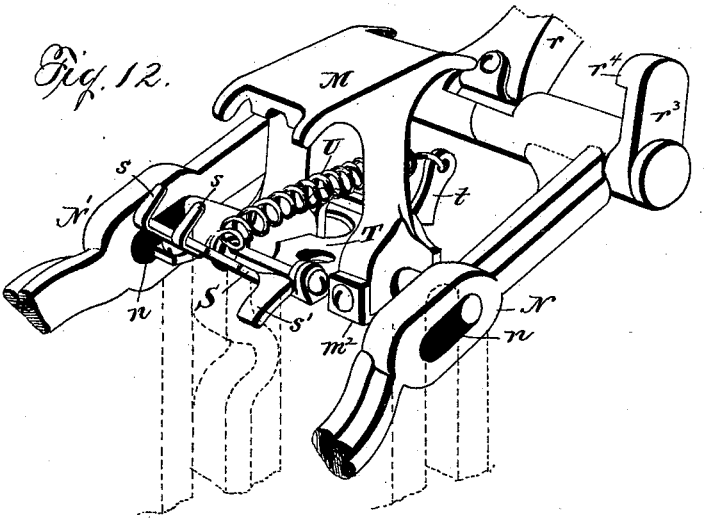
Figure 13:
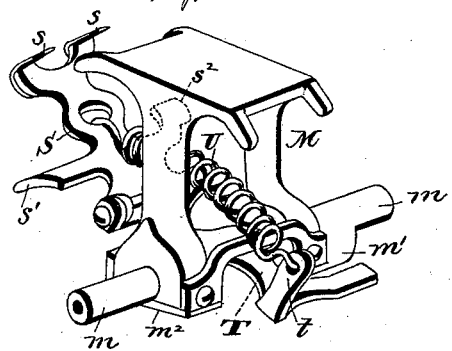
Figure 14:
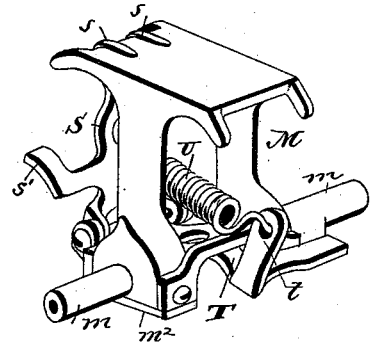
Figure 15:
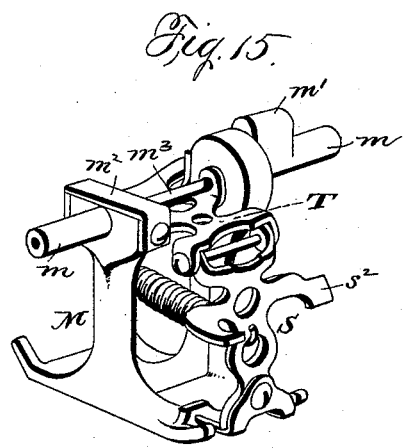
Figure 16:
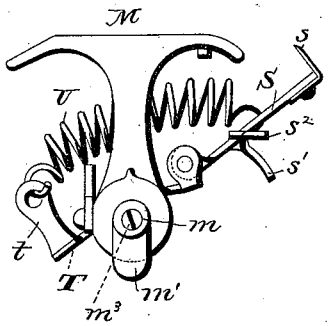
Figure 17:
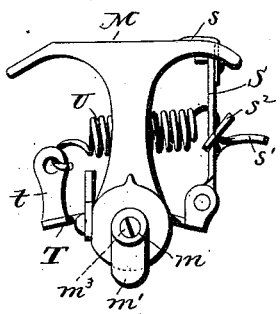
Figure 18:
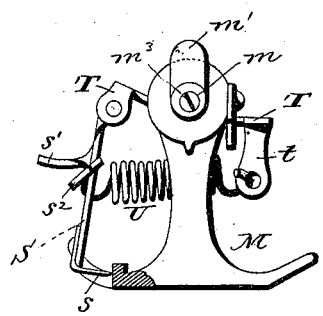
Figure 19:
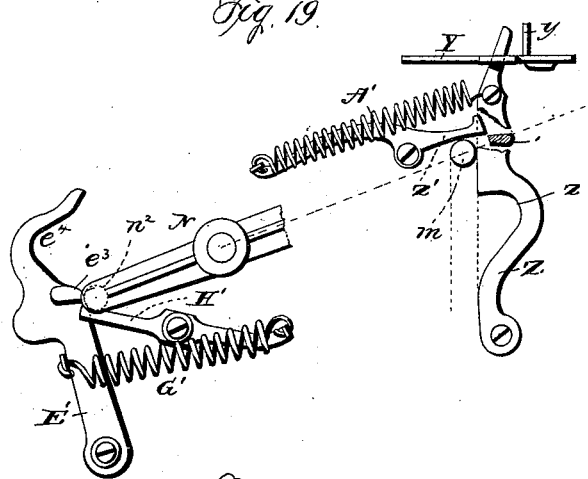
Figure 20:
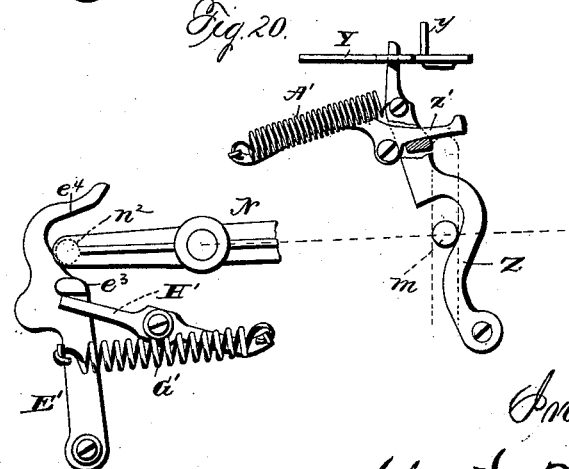
Figure 24:
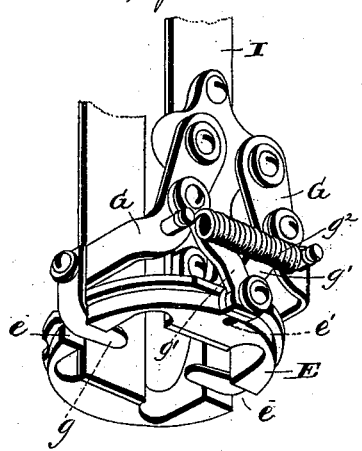
Figure 25:
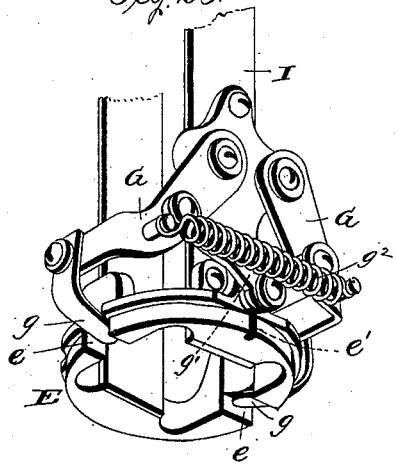
Figure 26:
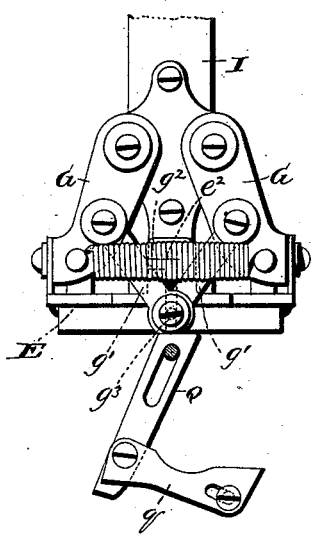
Figure 27:
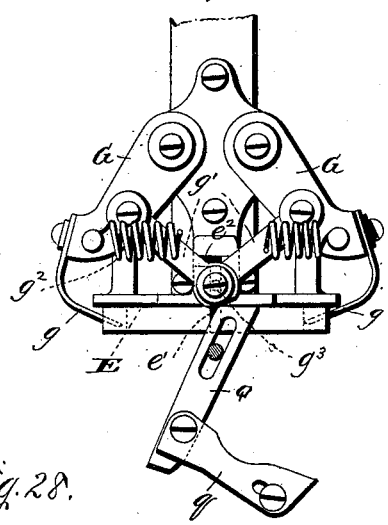
Figure 28:
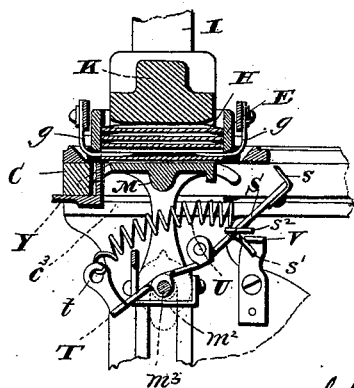
Figure 29:
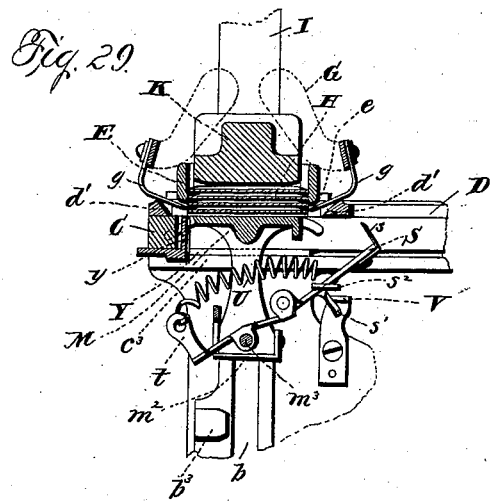
Figure 30:
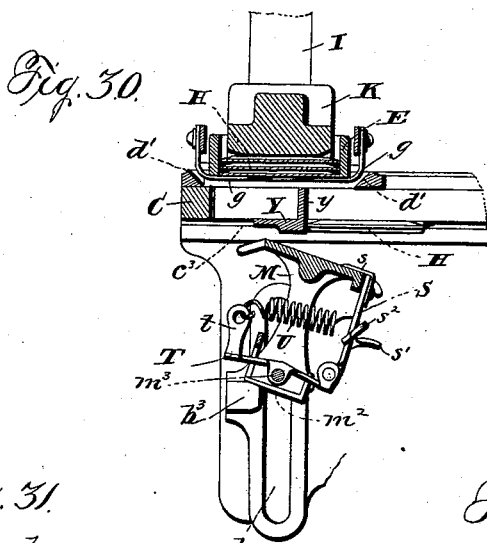
Figure 31:
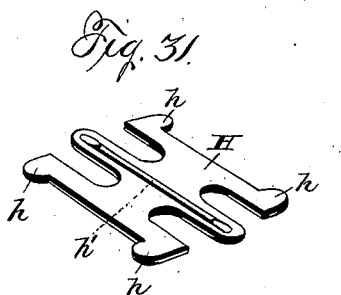
Figure 32:
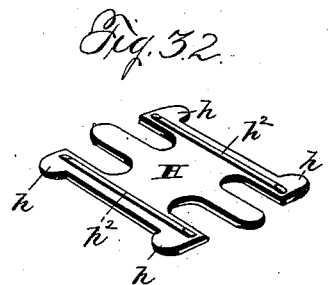

Figure 1 is a perspective view of my device as arranged for use. Fig. 2 is a plan view of the same from the upper side. Fig. 3 is a front elevation of said device, the stamp-hoppers being removed. Figs. 4 and 5 are elevations of opposite sides of the same. Fig. 6 is a perspective view of the frame separated from the operative parts. Fig. 7 is a like view of the head separated from the frame. Fig. 8 is a perspective view of said head and the contiguous parts of said frame united. Fig. 9 is a like view of the turret separated from its support. Fig. 10 is a section upon line $x$ $x$ of Fig. 3, the full lines showing the normal position of the operative parts and the dotted lines their positions when the stamp-carrier is midway between the extremes of its movements. Fig. 11 is a like view of the same with the stamp-carrier at the lower limit of its motion. Fig. 12 is a perspective view of the mechanism that transfers a stamp from its holder to the surface to which it is to be applied separated from the other portions of the device, the full lines showing the normal positions of parts and the dotted lines their positions when the stamp-carrier is at the lower limit of its motion. Fig. 13 is a like view of the stamp-carrier and the stamp-clamping mechanism when occupying their normal positions. Fig. 14 is a perspective view of the same after a stamp has been clamped upon said carrier. Fig. 15 is a like view of said carrier and its clamping mechanism when at the lower limit of their motion. Figs. 16, 17, and 18 are side elevations of the carrier and clamping mechanism and show, respectively, their normal positions, their positions when a stamp has been clamped in place, and their positions after a stamp has been released. Figs. 19, 20, and 21 are outline views, in side elevation, of the mechanism employed for operating the moistening-roller and ejecting the separator, and show, respectively, said parts when occupying their normal positions, when at the centers of their motion, and when at the limits of their motion in such direction. Figs. 22 and 23 are perspective views, in outline, of the mechanism for ejecting the separators and the stamp-carrier, and show, respectively, the relative positions of said parts before and after a separator has been ejected. Figs. 24 and 25 are like views from below of the lower end of a stamp-hopper, and show, respectively, the relative positions of parts before and after a stamp has been released. Figs. 26 and 27 are side elevations, in outline, of said stamp holding and releasing mechanism, and show, respectively, the positions of parts before and after a stamp has been released. Figs. 28, 29, and 30 are sections extending from front to rear through the stamp-holding mechanism, the stamp-carrier, and the separator-ejecting mechanism, and show the normal positions of parts, their positions after a stamp has been released, and their positions after a stamp has been clamped upon said carrier and a separator has been ejected; and Figs. 31 and 32 are perspective views from opposite sides of the device employed for separating stamps within the hopper.

Letters of like name and kind refer to like parts in each of the figures.

The object of my invention is to enable postage-stamps to be easily and quickly attached to or upon letters by mechanical means; and to this end my said invention consists in the means employed for holding and separating the stamps, for conveying the stamps from their holder to the surface upon which they are to be secured, for moistening stamps, and for causing such mechanism to automatically and in proper order perform their offices whenever an operating-handle is moved, substantially as and for the purpose hereinafter specified.

In the carrying of my invention into practice I employ a support for the operative mechanism, which preferably consists of a hollow base A, from which upon its rear part two flat bars B and B extend upward and forward and at their upper front portions are united by a head C, said parts having the form shown in Figs. 6, 7, and 8.

Upon the rear portion of the head C is a vertical stud $c$, that receives and journals a circular plate D, which plate is provided with a series of circular openings $d$ and $d$, that are equidistant and are located around the edge, as shown in Fig. 9. Fitted to each of said openings is a ring E, which forms the base of a stamp-hopper, is adapted, peripherally, to fit into its opening and to have its lower face flush with the lower face of said plate D, and is provided with suitable means whereby it may be easily inserted into and locked in place.

Interiorly the base E has an H shape, and to opposite ends of the same has secured the ends of a ∩-shaped bar I, the arms of which from thence extend upward in parallel lines and are separated by a space somewhat greater than the width of an ordinary postage-stamp F.

Pivoted upon the outer side of one of the bars I are two bars G and G, each of which, as shown in Figs. 1, 4, 24, and 25, from thence extends downward and outward and then across the side of the hopper-base E, and at its end carries a finger $g$, that extends downward and then in a curve inward. The lower portion of said finger is contained within a notch $d'$ in the plate D and a coinciding notch $e$ in said base E, and by a swinging motion of its bar G may be caused to occupy either of the positions shown in Figs. 24 and 25.

The bars G and G are connected together and caused to simultaneously move in opposite directions by means of two bars $g'$ and $g'$, which are pivoted together and to said bars, as shown, and are held normally in the position seen in Fig. 24, with the fingers beneath the base E, by means of a spring $g^2$, that extends between and has its ends connected with said bars G and G at or below the pivotal connections therewith of said bars $g'$ and $g'$. As thus arranged an upward pressure upon the connected ends of said bars $g'$ and $g'$ will cause said bars G and G to be moved apart so as to withdraw the fingers $g$ and $g$ from beneath said base E and leave the opening in the same unobstructed, while a removal of such upward pressure will enable said spring $g^2$ to act and cause said fingers to be returned to their former normal positions, when they operate to so obstruct the opening in said hopper-base and prevent the downward passage of stamps.

For the purpose of properly separating stamps within the hopper and permitting their ready removal therefrom there are placed between such stamps plates H and H, which are preferably made from sheet metal in the forms shown in Figs. 31 and 32, and by means of ears $h$ and $h$, that project laterally from the corners of each, are held in horizontal position between the arms of the bar I, while free to move vertically between the same.

Each separator-plate is provided upon its under side, near each of its outer edges, with a rib $h'$, that furnishes a bearing for a similar plate placed above, while upon its upper face at its transverse center is secured or formed a rib $h^2$, which extends to or near the end of the same and has its ends inclined or beveled, as shown. Said ribs, by reason of their relative arrangement, cause a stamp when placed between two separators to assume a curved position, as shown in Fig. 4, the highest point thereof being confined between the bottom of the upper separator and the rib $h^2$, which arrangement of the stamp, in conjunction with the inclined ends of said rib $h^2$, forms a space for the ready insertion of the fingers $g$ and $g$ between said stamp and the separator below it. A block K, having such shape as to permit it to slide vertically between the arms of said bar I, operates as a weight to press the stamps and separators downward, and its gravity is such as to prevent them from tilting, and so maintain them in a horizontal position on the fingers $g$ and $g$.

The filling or charging of the stamp-hoppers is effected by inverting them and inserting the stamps and separators through the opening in their lower ends. To permit this to be easily and conveniently done, it is necessary to move and hold the fingers $g$ and $g$ out of the way, and for this purpose the bars $g'$ and $g'$ are provided at the point where they are pivotally connected together with an inwardly-projecting stud or pin $g^3$, that engages with a groove $e'$, having at its top an offset $e^2$, said groove and offset being formed in an upwardly-extending portion of the ring or base E. With this construction, by merely raising the bars $g'$ and $g'$ and the stud $g^3$ until the latter coincides with the offset $e^2$ and then shifting said stud or pin into engagement with said offset, the fingers $g$ and $g$ will be moved and held entirely out of the way, so as to permit the ready insertion of stamps and separators into the hoppers. Upon disengaging said stud from the offset the fingers will be immediately returned to their former position by the springs $g^2$.

The plate or turret D may be rotated so as to cause any of the hoppers to occupy a position over the front portion of the head C. A pawl L, pivoted upon the latter and adapted to engage with notches $d^2$ and $d^2$ in the periphery of said turret, locks the latter in position when adjusted thereto.

Within the front portions of the frame-bars B and B are formed two vertical slots $b$ and $b'$, the first of which is straight, while said slot $b'$ has within its front side at its longitudinal center a U-shaped notch $b^2$. Passing through said slots are trunnions $m$ and $m$, that project laterally from a block M, which has the form shown in Figs. 13 and 14, and when moved to the upper limit of its motion has its face flush with the upper side or face of said head. One of said trunnions has upon its side a projection $m'$, that is adapted to engage with the notch $b^2$ and to give the said block a semi-rotation as the latter moves in each direction, so that at each limit of its vertical motion said block occupies a position directly opposite to that which it has at the opposite limit of its motion. Such partial rotations are aided by means of a ⊓-shaped lug $b^3$, that is formed upon the frame-bar B adjacent to the longitudinal center of the slot $b$, which lug is engaged by a squared portion $m^2$ upon said block.

The vertical movements of the block M are effected by means of two bars N and N', which are secured to the ends of a shaft O, that is journaled within the frame-bars B and B below and slightly in rear of the turret-stud $c$. Said bars N and N' are connected together at their front ends, so as to move in unison, and are each provided with a longitudinal slot $n$, that engages with the projecting end of the contiguous trunnion $m$. As arranged, by moving the front ends of said bars or levers downward or upward a corresponding motion will be given to said head. The normal positions of said parts are at the upper limit of their motion, and when permitted they are automatically returned to and held in such positions by means of a curved cam-bar O', which is pivoted in rear of the lever N', with its curved face in engagement with a roller $n'$, that is journaled upon the rearwardly-extended end of said lever. A spring P, having one of its ends attached to the front portion of the contiguous frame-bar B and its opposite end connected with an arm $o$, that projects upward from said cam-bar, presses the latter downward upon said roller with sufficient force to cause said parts when moved to the lower limits of their motion and then released to automatically return to their normal positions.

When in place at the upper limit of its motion, the block M is in position to receive and support a stamp F from the hopper above. Such stamp is released and permitted to fall upon said block by means of a bar Q, which is adapted to slide longitudinally upward through a slot $c^4$ in the head C and to impinge upon the pivoted ends of the bars $g'$ and $g'$. Such motion of the bar Q is effected by means of a lever R, that is pivoted upon the front ends of the bars N and N', the outer end $r$ of which lever constitutes an operating handle for the machine, while its inner end $r'$ is in position to engage with the lower end of said bar Q.

The limit of motion in one direction of the lever R is with its end $r'$ in position to engage with the lower end of the bar Q when the latter is at the lower limit of its motion, and said lever is held normally in such position by a spring $r^2$. The substantial limit of said lever in an opposite direction is when by pressure upon its outer end said bar Q has been moved to the upper limit of its motion, so as to release a stamp. After such release has been effected a continuation of downward pressure upon said lever will cause the levers N and N' to move upon their pivotal bearing and the block or carrier M to be moved downward and partially rotated.

In order that a short interval of time may elapse between the release of a stamp and the movement of the carrier, the engaging end $r'$ of the lever R is arranged to be tripped or disengaged just before reaching the limit of its upward motion. Such tripping may be effected by any one of the many constructions, one of which, as shown, consists of a bar $q$, that has its front end pivoted upon the lower portion of the bar Q and its opposite rear end so supported as to enable said bar to be moved longitudinally and its front end moved vertically. Said bar Q is arranged so that its lower end can be moved rearward and forward with said bar $q$. A spring $q'$ operates to hold the latter with a yielding pressure at the front limit of its motion.

With the construction shown the lever end $r'$, instead of engaging directly with the bar Q, engages with the front end of the bar $q$, and as they move upward in different paths said lever end $r'$ slips out of engagement with said bar $q$ at the predetermined time, and permits the stamp-releasing devices to close inward before the carrier commences to move downward.

As a precaution against a premature movement of the levers N and N', the lever R is provided with an arm $r^3$, which projects upward and rearward, and upon its inner face at its outer end has an inwardly-projecting lug $r^4$, that, when said lever occupies its normal position, passes behind a lug $c^2$ upon the head C. This construction renders impracticable a downward movement of said levers until said lever R has been turned upon its pivotal bearing sufficiently to move said lug $r^4$ out of engagement with said lug $c$.

After a stamp has been deposited upon the carrier M and the latter has moved slightly downward the former is clasped at its rear edge by a pair of fingers $s$ and $s$ that are secured upon one end of a lever S and from the same extend in a curve upward over the rear edge of said carrier. The opposite end of said lever is pivoted upon a second lever T, which is in turn pivoted centrally upon a rod $m^3$, that passes through the axis of said carrier. A spring U, that has one of its ends secured to said lever S near its center and its opposite end attached to an arm $t$, that extends upward from the front end of said lever T, operates to give to the fingers $s$ and $s$ a normal tendency to bear against the face and the rear edge of said carrier, so as to hold a stamp firmly down upon such face. When the carrier is at the upper limit of its motion, the lever S has its upper end moved rearward to the position shown in Fig. 10 by the engagement of a rearwardly-extending arm $s'$ with a lug V, which projects laterally inward from one of the frame-bars B. As said carrier moves downward said arm is released from ts engagement, and said lever resumes its normal position, with the fingers $s$ and $s$ impinging upon the face of the carrier or upon a stamp, if there be one in place thereon. When said carrier nears the lower limit of its motion and its face or a stamp is placed in contact with the surface to which the stamp is to be affixed, a lug W engages with a second arm $s^2$ upon said lever S and moves the finger end of the same forward until said fingers are drawn from off the face of the carrier or stamp, and their ends engage with the contiguous end of the former and maintain such position until upon the return of said carrier to its normal position the engagement of said arm $s'$ with said lug V causes the finger end of said lever S to be moved to its original position.

When the mechanism is operated so as to permit a stamp F and separator H to drop from the lower end of a hopper, the stamp rests upon the carrier M, with the separator upon its upper side, where it operates to temporarily hold the same in place. As said carrier descends, the clamping-fingers $s$ and $s$ grasp said stamp through notches in the end of said separator, and at the same instant the ears $h$ and $h$ of the latter engage with two horizontal ledges $c^3$ and $c^3$, that are provided within the head C, and prevent further downward movement of said separator, which is then ejected into a drawer X, that is provided in the rear portion of the base A, by the following-described mechanism: Fitted within the head C and adapted to slide back and forth over the ledges or ways $c^3$ and $c^3$ is a plate Y, which has the form shown in Figs. 22 and 23, and is moved within its path by means of a vertically-arranged lever Z, that is pivoted at its lower end upon one of the frame-bars B and has its upper end connected loosely with said plate or ejector Y. To the upper end of said lever is connected one end of a spring A', which has its opposite end connected with some relatively-stationary part and operates to move said lever and ejector to the rear limit of their motion when such movement is not obstructed. The rear edge of the lever Z bears against the contiguous trunnion $m$ of the carrier M, and at a suitable point is provided with a notch $z$, which, when said carrier has been moved downward a predetermined distance, passes over said trunnion and permits said lever and the ejector Y to be moved to the rear limit of their motion. The lower side notch has a rearward and downward curve, and a continuation of the downward movement of said carrier causes said trunnion to press said lever forward again to the limit of its motion in such direction, when it is locked in place by means of a pawl $z'$, that engages with its upper end. Being thus locked in place, said lever is prevented from moving rearward as said trunnion passes said notch upon its upward movement; but as the former reaches the upper limit of its motion it engages with said pawl $z'$, unlocks said lever, and leaves it free to repeat the movement described when the carrier is again moved downward. A spur $y$, projecting upward from the front end of the ejector Y, engages with the end of a separator H, and when moved rearward carries the latter in the same direction. The rearward movement of said ejector is sudden and causes a separator to be thrown in such direction with sufficient force to cause it to pass into and through a curved tube $x$ into the drawer X. A stamp is moistened in its downward passage by means of a roller B', that is journaled upon a lever C', which is pivoted upon the shaft O, and is by the following-described mechanism oscillated thereon so as to cause said roller to move from within a water-tank D' into position to have rolling contact with the exposed face of a stamp as the carrier moves downward, and then to return to position within said tank.

Pivoted at one end upon the side of one of the frame-bars B, near its rear lower portion, is a lever E', which has the form shown in Fig. 4, and near its longitudinal center has pivoted upon its inner side one end of a bar F', that from thence extends to and has its opposite end pivoted upon an arm $C^5$, which projects rearward and downward from the fulcrum of said lever C', the arrangement being such that a rearward movement of the upper end of said lever E' will cause the roller B' to be moved downward and rearward into the tank D', while by an opposite movement of said lever E' said roller will be moved forward and upward into position to have contact with a stamp. The lever E' is held with a yielding pressure at the front limit of its motion by means of a spring G', which extends between its center and some relatively stationary part, and is moved to the rear limit of its motion by a roller $n^2$, that is journaled upon the rearwardly-extended end of the bar N. When the carrier M is at the upper limit of its motion, said roller bears against the straight portion $e^3$ of the front edge of said lever and holds the latter at the rear limit of its motion with the moistening-roller B' within the tank D'; but as said carrier moves downward said roller $n^2$ passes upon the rearward, upward, and forward curved cam part $e^4$ of said lever and permits said spring to draw the latter forward, so as to move said moistening-roller into position to have contact with the passing stamp. After contact between the roller B' and a stamp the continued upward movement of the rear end of the bar N causes the roller $n^2$ to travel over the upward and forward curving portion of the cam part $e^3$ of the lever E' and forces said lever to the rear limit of its motion, where it is locked in position by means of a pawl H'. Said pawl is situated so that when the carrier M is returned to the upper limit of its motion it is engaged by said roller $n^2$ and released from engagement with said lever E', and the latter is then held in place by said roller, as before described.

The water-tank D' has the construction shown in Fig. 10, so as to have but a small quantity of water exposed and to be self-feeding while the supply lasts. It is provided upon each of its sides with a horizontal rib $d^3$, which is received by a corresponding groove in the side of the contiguous frame-bar B and may be readily placed in or removed from position. When in place, a set-screw $d^4$, passing through one of said frame-bars and impinging upon one of said ribs, operates to lock said reservoir in position.

For the support of letters while stamps are being applied to the same, and to enable letters having different thicknesses to be stamped, a table I' is provided within the base A in suitable position, and is supported upon or by means of springs which will yield and permit said table to be pressed downward.

The device is now complete and furnishes a convenient means for stamping letters. In use the hoppers are filled with stamps and separators at times when time is of least value, and the contents of each hopper are indicated by pasting a stamp of the denomination therein contained upon the upper end of each hopper. But an instant is necessary to rotate the turret to bring any desired hopper into position for use, and several hoppers may be filled with the same denomination of stamp and successively used when a large number of letters are to be stamped. When the device is not in use, the hoppers may be detached from the turret and placed in a safe, or said turret with its hoppers may be detached and stored.

For the convenient storage of ungummed stamps, special-delivery stamps, &c., a drawer K' is provided in the base A.

Having thus described my invention, what I claim is—

1. A mechanism for affixing stamps in which are combined an oscillating stamp-carrier having its stamp-receiving face turned upward when in position to receive a stamp, and a stamp hopper or holder which delivers stamps thereto, substantially as and for the purpose specified.

2. A mechanism for affixing stamps in which are combined an oscillating stamp-carrier having its stamp-receiving face turned upward when in position to receive a stamp, pivoted fingers to impinge upon and confine a stamp thereto, and a stamp-hopper arranged above the same and adapted to discharge stamps thereto one at a time, substantially as and for the purpose shown.

3. A mechanism for affixing adhesive stamps in which are combined an oscillating stamp-carrier having its stamp-receiving face turned upward when in position to receive a stamp, a stamp-hopper arranged above the same and adapted to discharge stamps thereto one at a time, and a device for moistening a stamp in transit to the surface to which it is to be attached, substantially as and for the purpose specified.

4. A mechanism for affixing adhesive stamps in which are combined an oscillating stamp-carrier having its stamp-receiving face turned upward when in position to receive a stamp, and a series of stamp-hoppers supported above the same and adapted for successive co-operation therewith, substantially as and for the purpose set forth.

5. A mechanism for affixing adhesive stamps in which are combined an oscillatory invertible carrier, a stamp hopper or holder which delivers stamps thereto, and means for moistening stamps, substantially as and for the purpose shown.

6. A mechanism for affixing adhesive stamps in which are combined stamp-holding devices, an oscillatory vertically-movable carrier below the same, devices for delivering stamps to said carrier when at the upper limit of its vertical motion, and means for moistening a stamp in its transit to the surface to which it is to be affixed, substantially as and for the purpose set forth.

7. A mechanism for affixing adhesive stamps in which are combined a supporting-frame, a rotary invertible carrier, stamp holding devices supported above the latter and adapted to discharge stamps one at a time upon the same, and an operating-lever for causing such discharge of the stamps and the movement of the carrier, substantially as and for the purpose described.

8. A mechanism for affixing adhesive stamps, in which are combined stamp-holding devices, a stamp-carrier arranged below the latter, to which stamps may be delivered from said holding devices, and a lever for operating said carrier and causing a delivery of stamps thereto, substantially as and for the purpose specified.

9. In a device for affixing adhesive stamps, in combination, stamp-holding devices having movable fingers to support stamps, a stamp-carrier, and a lever to disengage said fingers from the stamps and to operate said carrier, substantially as and for the purpose set forth.

10. In a device for affixing adhesive stamps, in combination, stamp-hoppers having the movable stamp-retaining devices, a stamp-carrier, a lever to disengage said retaining devices from the stamps, and the mechanism between said lever and devices, substantially as and for the purpose shown.

11. In a device for affixing adhesive stamps, in combination, the supporting-plates provided with guide-slots, a carrier mounted between such plates and having trunnions projecting through such slots, the pivoted bars engaging said trunnions, the operating-handle connecting the ends of said bars, the head connecting said supporting-plates, and the stamp holding and discharging devices, the latter being operated by said handle, substantially as and for the purpose described.

12. In a device for affixing adhesive stamps, in combination, the supporting-plates provided with guide-slots, a carrier mounted between such plates and having trunnions projecting through said slots, the pivoted operating-lever engaging said trunnions, the head connecting said supporting-plates at their upper ends, the turret mounted on said head, and the series of stamp-hoppers adapted for successive co-operation with said carrier, substantially as and for the purpose specified.

13. In a device for affixing adhesive stamps, in combination, the supporting-plates provided with guide-slots, an oscillatory invertible carrier mounted between such plates and having trunnions projecting through said slots, the stamp-moistening devices, the pivoted operating-lever engaging said trunnions and said moistening devices, the head connecting the supporting-plates at their upper ends, and the stamp-holding devices mounted on such head and adapted to deliver stamps to the carrier, substantially as and for the purpose set forth.

14. In a device for affixing adhesive stamps, in combination, the supporting-plates provided with guide-slots, a rotary invertible carrier mounted between such plates and having trunnions projecting through said slots, the stamp-moistening devices, the pivoted operating-lever engaging said trunnions and said moistening devices, the head connecting the supporting-plates at their upper ends, the stamp and stamp-separator holding devices mounted on such head, the mechanism for discharging stamps and separators therefrom, and the separator-ejecting mechanism, substantially as and for the purpose shown.

15. In a device for affixing adhesive stamps, a hopper for storing stamps which at its lower end is provided with pivoted fingers connected by a spring that operates to confine the contents in place and are adapted to be withdrawn to permit of the delivery of a stamp from said hopper, substantially as and for the purpose described.

16. In combination with a stamp-hopper open at its lower end to discharge stamps therefrom, the fingers projecting inwardly from opposite sides of said bottom and having connections between them, so as to cause them to move together, substantially as and for the purpose specified.

17. In combination with a stamp-hopper open at its lower end to discharge stamps therefrom, the pivoted fingers projecting inwardly from opposite sides and the pivoted bars connecting said fingers, substantially as and for the purpose set forth.

18. In a device for affixing adhesive stamps, a stamp-hopper open at its lower end to discharge stamps therefrom and the pivoted spring-connected fingers projecting inwardly from opposite sides, in combination with means whereby said fingers are automatically withdrawn to permit of the successive and separate delivery of stamps, substantially as and for the purpose shown.

19. In combination with a stamp-hopper open at its lower end to discharge stamps therefrom, the inwardly-projecting fingers having yielding connections between them, substantially as and for the purpose described.

20. In a device for affixing adhesive stamps, in combination with a stamp-hopper, plates having projections on their upper and lower sides, which are placed between and operate to keep the stamps separate from each other, substantially as and for the purpose specified.

21. In combination with a device for affixing adhesive stamps, having means for holding stamps in a column, means for holding the stamps in such column out of contact, which consist of plates placed between adjacent stamps, substantially as and for the purpose specified.

22. In combination with a device for affixing adhesive stamps, having a hopper for holding a column of stamps, means for holding the stamps out of contact, which consist of plates placed between adjacent stamps and which horizontally substantially fill said hopper, substantially as and for the purpose shown.

23. In a device for use in affixing adhesive stamps, in combination with a stamp-hopper provided with a discharge-opening, plates within and guided by said hopper for the separation of adjacent stamps within the same, substantially as and for the purpose described.

24. In a device for use with stamp-affixing mechanism, a plate for the separation of stamps arranged in a column having a projection centrally disposed on one face and two projections arranged near its edges on its other face, substantially as and for the purpose set forth.

25. A mechanism for affixing adhesive stamps, in which is combined, with means for storing and delivering detached stamps, a carrier that is adapted to receive each stamp as it is delivered, to move the same into contact with a moistening device, and to deposit the stamp upon and press it against the surface to which it is to be attached, substantially as and for the purpose set forth.

26. In a mechanism for affixing adhesive stamps, a carrier-block which is adapted to be moved vertically within certain limits and to have its position reversed when thus moved, in combination with stamp storing and delivering devices and mechanism that operates to confine a stamp upon the face of such carrier at the upper limit of its motion and to release said stamp when said carrier reaches the lower limit of its motion, substantially as and for the purpose described.

27. In a mechanism for affixing adhesive stamps, in combination with a suitable support, a reciprocable and rotary carrier adapted to receive a stamp, move it into contact with a moistening device, and press it against the surface to which it is to be attached, substantially as and for the purpose specified.

28. In a mechanism for affixing adhesive stamps, in combination with a suitable support, a reciprocable and rotary carrier, means for delivering a stamp thereto, and a device to automatically engage therewith to confine a stamp and to automatically disengage therefrom to release said stamp, substantially as and for the purpose shown.

29. In a mechanism for affixing adhesive stamps, in combination with a suitable support having guide-slots, a reciprocable carrier receiving and carrying stamps one at a time, having bearings in such slots, and means for co-operating with said carrier to confine a stamp thereto and permit its removal therefrom, substantially as and for the purpose set forth.

30. In a mechanism for affixing adhesive stamps, in combination with a supporting-frame, a stamp-carrier, a device for confining a stamp to the latter, and devices on said supporting-frame to engage with and operate said confining device, substantially as and for the purpose described.

31. In a stamp-affixing mechanism, in combination with a stamp-carrier, a stamp-confining device adapted to co-operate therewith, and a spring for carrying said device into and retaining it in contact with a stamp thereon, substantially as and for the purpose specified.

32. In a stamp-affixing mechanism, in combination with a stamp-carrier, a stamp-confining device adapted to co-operate therewith, a spring for carrying said device into contact with a stamp thereon, and devices for disengaging it from said stamp, substantially as and for the purpose shown.

33. In a stamp-affixing mechanism, in combination with a stamp-carrier, a pivoted stamp-confining device adapted to be thrown into and out of engagement with a stamp placed upon said carrier, substantially as and for the purpose set forth.

34. In a stamp-affixing mechanism, in combination with a stamp-carrier, a pivoted stamp-confining device, a spring for carrying the latter into engagement with said carrier, and the lugs for effecting its disengagement therefrom, substantially as and for the purpose described.

35. In a stamp-affixing mechanism, in combination, a stamp-carrier, a water-receptacle, a moistening device movable from said receptacle into contact with a stamp when on said carrier, a spring for effecting said movement, and the carrier-operating lever connected to said moistening device and effecting its return to said receptacle, substantially as and for the purpose specified.

36. In a stamp-affixing mechanism, in combination, a stamp-carrier, a water-receptacle, and a moistening-roller movable from said receptacle into yielding contact with a stamp when on said carrier, substantially as and for the purpose shown.

37. In a stamp-affixing mechanism, in combination, a stamp-carrier, a water-receptacle, a moistening device, and a spring for moving the latter from a stamp when on said receptacle into contact with said carrier, and means for moving it away therefrom, substantially as and for the purpose set forth.

38. In a stamp-affixing mechanism, in combination, a stamp-carrier, a moistening device, and a spring for moving the latter into contact with a stamp when on said carrier, and means for moving it away therefrom, substantially as and for the purpose described.

39. In a stamp-affixing device, in combination, a stamp-carrier, a moistening device, a spring for moving the latter into contact with a stamp when on said carrier, and a lever for moving it out of the path thereof, substantially as and for the purpose specified.

40. In a stamp-affixing mechanism, in combination, a stamp-carrier, an operating-lever therefor, a second pivoted lever engaged by said operating-lever, a stationary water-receptacle, an oscillating moistening device movable into and out of the latter, and a bar or link connecting said moistening device to said pivoted lever, substantially as and for the purpose shown.

41. In a stamp-affixing mechanism, in combination, a stamp-carrier, a lever to operate the latter, a stationary water-receptacle, an oscillating moistening device movable into and out of the latter, a pivoted arm engaged by said lever and connected to said moistening device to cause its movements, and a locking-pawl adapted for engagement with and to be released from said pivoted arm, substantially as and for the purpose shown and described.

42. In a stamp-affixing mechanism, in combination, a stamp-carrier, a stationary water-receptacle, a moistening-roller, a pivoted arm carrying the latter, and the devices for moving the roller into and out of the path of said carrier, substantially as and for the purpose set forth.

43. In a stamp-affixing mechanism, in combination, a rotary stamp-carrier, a water-receptacle, a moistening-roller, a pivoted arm carrying the latter, a spring for moving said roller out of said receptacle into the path of said carrier, and a lever for returning said roller into said receptacle, substantially as and for the purpose specified.

44. In a stamp-affixing mechanism, in combination with a stamp-carrier, a series of stamp-receptacles and a revoluble turret carrying the latter, substantially as and for the purpose shown.

45. In a stamp-affixing mechanism, in combination with an oscillatory stamp-carrier, a revoluble turret having a series of openings and a series of stamp-receptacles arranged over said openings and adapted for successive co-operation with said carrier, substantially as and for the purpose set forth.

46. In combination with a stamp-affixing mechanism, a revoluble turret and a series of stamp-hoppers, substantially as and for the purpose specified.

47. In combination with a stamp-affixing mechanism, a revoluble turret and a series of detachable stamp-receptacles, substantially as and for the purpose shown.

48. In a stamp-affixing mechanism, in combination with a stamp-carrier, a stamp receptacle or hopper, the stamp-separating plates, means for liberating the latter one at a time from said hopper, and means for ejecting each one as liberated out of the way of a succeeding one, substantially as and for the purpose set forth.

49. In a stamp-affixing mechanism, in combination with a stamp-carrier, a stamp-hopper, stamp-separating plates, means for liberating the latter one at a time from said hopper, and a reciprocating ejector-plate, substantially as and for the purpose described.

50. In a stamp-affixing mechanism, in combination with a stamp-hopper, stamp-separating plates, means for liberating the latter one at a time from said hopper, and a spring-actuated ejector-plate, substantially as and for the purpose specified.

51. In a stamp-affixing mechanism, in combination with a stamp-hopper, stamp-separating plates, means for liberating the latter one at a time from said hopper, a reciprocating ejector-plate and a pivoted spring-actuated lever for moving the same, substantially as and for the purpose shown.

52. In a stamp-affixing mechanism, in combination with a stamp-hopper, stamp-separator ejecting mechanism consisting of a reciprocating plate and means to automatically cause its reciprocations, substantially as and for the purpose set forth.

53. In combination with stamp-affixing mechanism, a supporting-frame provided with a stamp-carrier, guideways, a holder for stamps and stamp-separators, and a separator-ejecting plate reciprocable in said guideways, substantially as and for the purpose specified.

54. In a stamp-affixing mechanism, in combination with a supporting-frame, a reciprocating separator-ejecting plate, a pivoted lever engaging with the latter, and a reciprocating stamp-carrier provided with means to cause a movement of said lever in one direction, substantially as and for the purpose shown.

55. In a stamp-affixing mechanism, in combination, a supporting-frame, a separator-ejecting plate, a pivoted lever engaging with the latter, and a reciprocating carrier having a part to engage with said lever to set said plate, substantially as and for the purpose set forth.

56. In a stamp-affixing mechanism, in combination, a supporting-frame, a separator-ejecting plate, a pivoted lever engaging with the latter, a spring for moving said plate in one direction, a reciprocating carrier having a part to engage with said lever to set said plate, and a locking device to hold said plate when set, substantially as and for the purpose described.

57. In combination with the stamp-carrying mechanism, the pivoted operating-lever, the cam-bar pivoted in rear of the latter and engaging the rearwardly-extended end thereof, and the spring connected to said cam-bar and a relatively-fixed part to return said lever to and hold it in its normal position, substantially as and for the purpose shown.

58. In combination with the stamp-carrying mechanism, the pivoted operating-lever, the pivoted cam-bar engaging therewith and having an upwardly-extending arm, and a spring extending between the latter and a relatively-fixed part to return said lever to and hold it in its normal position, substantially as and for the purpose set forth.

59. In combination with a stamp-hopper having stamp-retaining devices adapted to be moved into and out of the path of stamps, a lock to hold the stamp-retaining devices in a position to permit the insertion of stamps into said hopper, substantially as and for the purpose shown.

60. In combination with a stamp-hopper and the movable connected fingers co-operating with its lower end, a device to lock said fingers in a position so as to permit the insertion of stamps into said hopper, substantially as and for the purpose described.

61. In combination with a stamp-hopper and the movable fingers co-operating with its lower end, the stud and-slot connection between said hopper and said fingers operating as a lock to hold said fingers in a position to permit the insertion of stamps into said hopper, substantially as and for the purpose set forth.

62. In combination with a stamp-hopper, movable fingers co-operating with its lower end, two bars connected to each other and to said fingers, and a stud provided on said bars at their point of connection engaging with a slot having an offset that is provided in said hopper, substantially as and for the purpose specified.

In testimony that I claim the foregoing I have hereunto set my hand this 24th day of March, 1890.

CHARLES W. TOBEY.

Witnesses:
DANIEL A. BUTLER,
LUTHER M. DAYTON.